United States Patent
Iwai (10) Patent No.: US 6,292,594 B1
(45) Date of Patent: Sep. 18, 2001

(54) IMAGE READING DEVICE, IMAGE FORMING APPARATUS, AND IMAGE FORMING METHOD

(75) Inventor: Kenichi Iwai, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/157,940

(22) Filed: Sep. 22, 1998

(30) Foreign Application Priority Data

Sep. 22, 1997 (JP) .................................................. 9-257319

(51) Int. Cl.[7] ............................................................ G06K 9/32
(52) U.S. Cl. ............................ 382/298; 358/451; 358/474
(58) Field of Search .................................. 382/298, 299; 358/451, 496, 497, 448, 474

(56) References Cited

U.S. PATENT DOCUMENTS 5,856,879 * 1/1999 Suzuki et al. .......................... 358/474

6,032,864 * 3/2000 Hamasuna ............................ 358/448

FOREIGN PATENT DOCUMENTS 04-233874 A * 8/1992 (JP) ................................ H04N/5/232
7-336506    12/1995 (JP) .

* cited by examiner

*Primary Examiner*—Thomas D. Lee
(74) *Attorney, Agent, or Firm*—Foley & Lardner (57) ABSTRACT

According to an image reading apparatus of the present invention, a basic section CPU controls a scanning speed of a carriage of a scanner unit at a predetermined level by driving a scanning motor. A CCD of the scanner unit receives reflection light from a document scanned by the scanner unit, photoelectrically converts the reflection light into electric signals to accumulate it therein. An ASIC for controlling the scanner controls the processing of the electric signals accumulated in the CCD with a cyclic period corresponding to a magnification rate set for an image of the scanned document.

2 Claims, 5 Drawing Sheets

IMAGE READING DEVICE, IMAGE FORMING APPARATUS, AND IMAGE FORMING METHOD

BACKGROUND OF THE INVENTION

This invention relates to an image reading device for reading image by scanning a document, an image forming apparatus such as a digital copying machine which forms an image by using the image reading apparatus, and an image forming method.

Conventionally, the change of the image magnification rate in the sub-scanning direction in a digital copying machine (DPPC) is performed by changing a scanning speed of a scanner for scanning a document in accordance with the magnification rate. The scanning speed of the scanner is determined by variably controlling the rotation number of a motor for driving the scanner. Accordingly, in changing the magnification rate in the sub-scanning direction, the number of effective data in the main scanning direction is determined by variably controlling the rotation number of the motor within the available magnification range defined in the specification of the machine.

According to the conventional method as mentioned above, the scanner must be controlled to change the scanning speed every time when the magnification rate is desired to be changed in order to obtain the set magnification rate. The scanner is controlled by changing the rotation number of the motor for driving the scanner in accordance with the desired magnification rate.

In a middle or low speed DPPC machine which is not required so high speed scanning operation (i.e., in a machine the scanning speed of the scanner of which is relatively low when the scanning speed is set at the highest level at which the image reduction rate is largest) within a variable range of the rotation number of the motor (i.e., within a variable range of the scanning speed of the scanner), the scanning speed of the scanner is reasonable in mechanical point of view with respect to the driving specification of the motor.

However, in a high-speed machine, the operation speed of the scanner is so high that some functional problems will occur. For example, due to the limitation generated by the acceleration condition of a stepping motor which drives a scanner, a necessary run-up distance of the scanner cannot be secured in the scanning width in the sub-scanning direction. In addition, the vibration of a carriage will be generated by the high-speed scanning operation, thereby the image obtained by the scanning will be distorted. According to the conventional method, the above-mentioned problems will be made so critical.

BRIEF SUMMARY OF THE INVENTION

The object of the present invention is to provide an image reading apparatus capable of suppressing or preventing the problems generated due to the high-speed operation of a scanner, and an image forming apparatus and an image forming method.

The above-mentioned object of the present invention is attained by an image reading apparatus comprising scanning means for scanning a document by irradiating the document with a light beam, first control means for controlling a scanning speed of the scanning means at a constant level, reading means for reading reflected light from the document scanned by the scanning means by receiving the light and photoelectrically converting the reflected light into an electric charge signal corresponding to an image on the document so as to accumulate the electric charge signal, and setting means for setting a magnification rate of the image read by the reading means, second control means for controlling processing of the electric charge signal photoelectrically converted and accumulated in the reading means with a cyclic period determined in accordance with the magnification rate set by the setting means.

The above-mentioned object of the present invention is attained by an image reading apparatus comprising setting means for setting a magnification rate for magnification rate change operation such as reduction, non-reduction/magnification, and magnification, scanning means for scanning a document by irradiating the document with a light beam, first control means for controlling a scanning speed of the scanning means at a constant level, photoelectric conversion means for receiving reflected light from the document scanned by the scanning means, and for photoelectrically converting the reflected light into an electric charge signal to accumulate it, second control means for variably controlling a period of time during which the reflected light converted into the electric charge signal is accumulated in a photosensing section of the photoelectric conversion means in accordance with the magnification rate set by the setting means, image processing means for processing image on the basis of the electric charge signal accumulated in the photoelectric conversion means and processed during the period of the time controlled by the second control means, image forming means for forming image on an image forming medium on the basis of image data processed by the image processing means.

The above-mentioned object of the present invention is attained by an image forming method of forming image on an image forming medium by using setting means for setting a magnification rate for magnification rate change operation such as reduction, non-reduction/magnification, and magnification; scanning means for scanning a document by irradiating the document with a light beam; and photoelectric conversion means for receiving reflected light from the document scanned by the scanning means and for photoelectrically converting the reflected light into an electric charge signal to accumulate it, wherein the scanning speed of the scanning means is switched to be set at a constant level or variable in accordance with the magnification rate set by the setting means, when the scanning speed of the scanning means is set at the constant level by the switching means, the scanning speed of the scanning means is controlled at the constant level irrelevant to the magnification rate set by the setting means, and when the scanning speed of the scanning means is set variable, the scanning speed of the scanning means is controlled to be variable in accordance with the magnification rate set by the setting means, when the scanning speed of the scanning means is set at the constant level, a period of time during which the reflected light converted into the electric charge signal is accumulated in a photosensing section of the photoelectric conversion means is variably controlled in accordance with the magnification rate, and when the scanning speed of the scanning means is set variable, the period of time during which the reflected light converted into the electric charge signal is accumulated in a photosensing section of the photoelectric conversion means is set at a constant value, image processing is executed during one of the variably controlled period of time and the constant period of time on the basis of the electric charge signal accumulated in the photoelectric conversion means, and an image is formed on the image forming medium on the basis of the processed image data.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will be described below with reference to the drawings.

Figure 1:
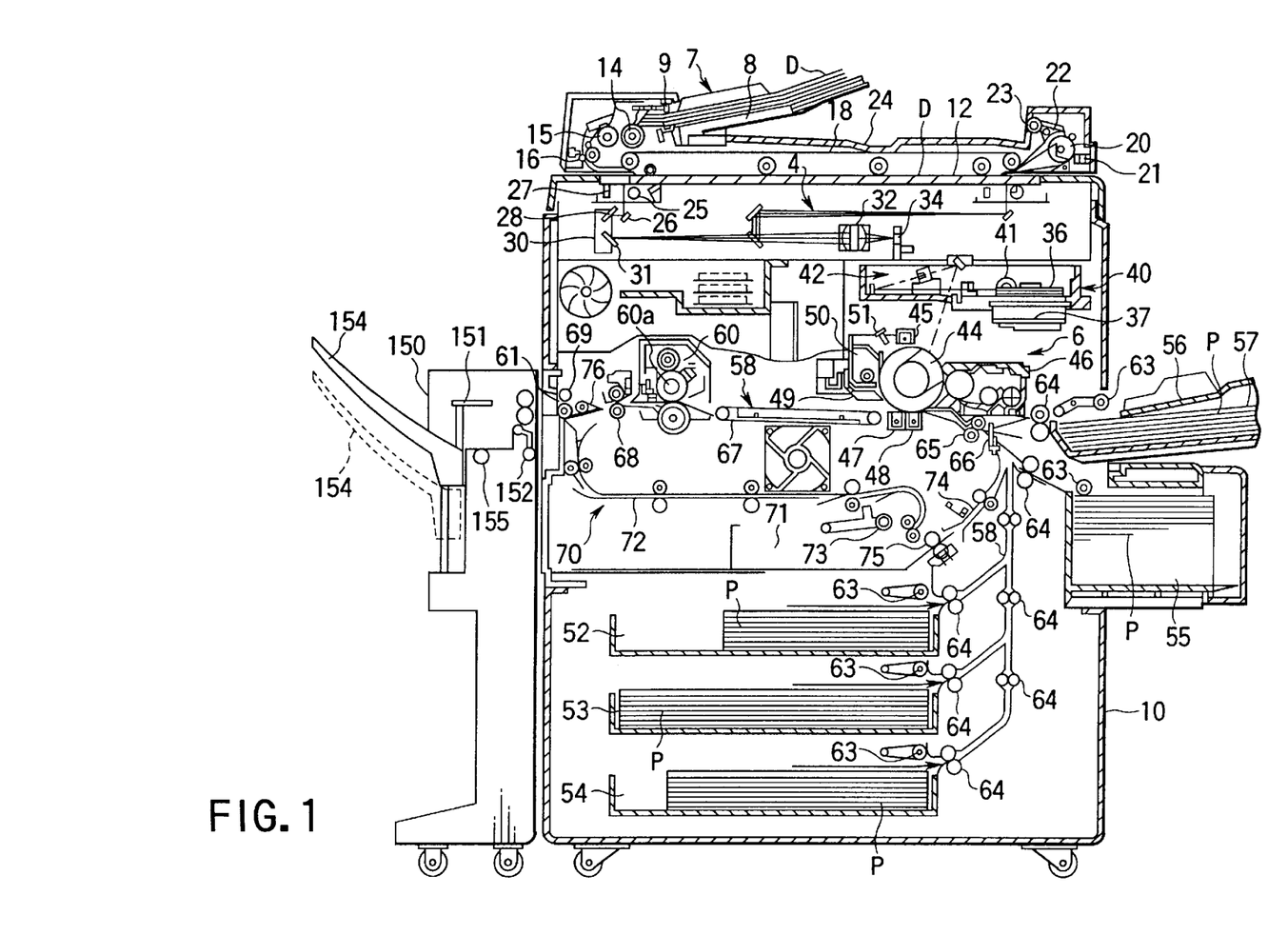
FIG. 1 is a schematic view illustrating a digital copying machine according to the present invention.

FIG. 1 is a view showing an inner structure of a digital copying machine (DPPC) as one example of the image reading apparatus and the image forming apparatus of the present invention.

As shown in FIG. 1, the digital copying machine has a machine body 10 which is provided with a scanner section 4 functioning as image reading means described later and a printer section 6 functioning as image forming means.

On the upper face of the machine body 10, an document mount 12 having a transparent glass plate for mounting thereon an object to be read, i.e., the document D, is provided. The upper face of the machine body 10 is also provided with an automatic document feeder (hereinafter referred to as "ADF") 7 for automatically feeding the document to the document mount 12. The ADF 7 is arranged to be opened/closed with respect to the document mount 12, and also functions as a weight for keeping the document D from lifting off the document mount 12.

The ADF 7 comprises an document tray 8, an emptiness sensor 9 for sensing the presence/absence of the document, a pick-up roller 14 for picking the document up one by one, a feeding roller 15 for conveying the document picked by the pick-up roller 14, an aligning roller pair 16 for aligning the distal end of the document, and a conveyer belt 18 arranged to cover substantially the entire portion of the document mount 12. A plurality of document sheets turning their document faces upward on the document tray 8 are picked up one by one from the lowest page, i.e., the last page. After the distal end portion of the sheet is aligned by the aligning roller pair 16, the sheet is conveyed by the conveyer belt 18 to a predetermined position on the document mount 12.

In the ADF 7, the aligning roller pair 16 faces an overturning roller 20, non-overturned sheet sensor 21, a flapper 22, and a discharge roller 23, which are arranged at the end of the opposite side to that of the aligning roller pair 16 so as to arrange the conveyer belt 18 therebetween. The document D from which image information is read by the scanner section 4 described later is transferred from the document mount 12 by the conveyer belt 18, and discharged to a discharge section 24 on the upper surface of the ADF 7 via the overturning roller 20, the non-overturned sheet sensor 21, and the flapper 22. When the rear face of the document D needs to be read, the document D transferred by the conveyer belt 18 is overturned by the overturning roller 20, and then transferred to a predetermined position of the document mount 12 again through the conveyer belt 18 by the switched flapper 22.

The scanner section 4 arranged in the machine body 10 has an exposing lamp 25 as a light source for irradiating the document D mounted on the document mount 12 and a first mirror 26 for deflecting the light reflected by the document D in a predetermined direction. The exposing lamp 25 and the first mirror 26 are attached to a first carriage 27 arranged on a lower surface of the document mount 12.

The first carriage 27 is arranged movably in parallel to the document mount 12, and is reciprocated below the document mount 12 by a driving motor with use of a gear belt (not shown) or the like.

The lower surface of the document mount 12 is also provided with a second carriage 28 capable of moving in parallel to the document mount 12. The second carriage 28 is provided with second and third mirrors 30 and 31 for deflecting the reflection light from the document D which is deflected by the first mirror 26, in order. The second and third mirrors 30 and 31 are attached to the second carriage 28 so as to form a right angle with each other. The second carriage 28 is moved together with the first carriage 27 by the gear belt which drives the first carriage 27, and is moved at a speed of a half of that of the first carriage 27 in parallel with the first carriage 27 along the document mount 12.

Below the document mount 12, an image forming lens 32 for converging the reflection light from a third mirror 31 which is attached to the second carriage 28 and the quadruplex CCD (photoelectric conversion element) 34 for receiving the converged reflection light to convert the reflected light into electric charge are arranged. The image forming lens 32 is arranged on a plane including the light axis of the light deflected by the third mirror 31, so as to be movable by a driving mechanism. The image forming lens 32 moves itself to form an image from the reflection light with a desired magnification. The quadruplex CCD 34 converts the received reflection light into electric charge so as to output an electric signal corresponding to the image of the document D. The output signal of the CCD is input into an image processing circuit 35 which is incorporated into a printed board, through a quadruplex CCD circuit described later.

The printer section 6 as another main section of the apparatus is provided with a laser exposing apparatus 40 functioning as an electrostatic image forming means. The laser exposing device 40 comprises a semiconductor laser device 41 as a light source; a polygon mirror 36 as a scanning member for successively deflecting the laser beam emitted by the semiconductor laser device 41; a polygon motor 37 as a scanning motor for driving the polygon mirror 36 by rotating the polygon mirror 36 at a predetermined rotation rate; and an optical system 42 for guiding laser beam traveling from the semiconductor laser device 41 to a photosensitive drum 44 through the polygon mirror by deflecting the laser beam. The laser exposing apparatus 40 having such a structure is fixedly supported by a supporting frame (not shown) of the machine body 10.

The semiconductor laser device 41 is turned on/off in accordance with the image information read from the document D by the scanner 4 or the document information transmitted from a facsimile apparatus. The laser beam emitted from the semiconductor laser device 41 is directed to the photosensitive drum 44 via the polygon mirror 36 and the optical system 42, and scans the circumferential surface of the photosensitive drum 44 to form an electrostatic image on the circumferential surface of the photosensitive drum 44.

The printer section 6 has a rotatable photosensitive drum 44 as an image holder which is arranged in a substantially central portion of the machine body 10. The photosensitive drum 44 is exposed on the circumferential surface to the laser beam from the laser exposing apparatus 40, to form a predetermined electrostatic image thereon. The photosensitive drum 44 is surrounded by the following components arranged as if they were an integral device: a charger 45 for electrostatically charging the circumferential surface of the drum at a predetermined level; a developer 46 for supplying toner as developing agent to the electrostatic image formed on the circumferential surface of the photosensitive drum 44 in order to develop the image with desired image density; and a peeling charger 47 for peeling an object which is fed from the paper feeding cassette described later and on which the toner image formed on the photosensing drum, i.e., the copy sheet P, off the circumferential surface of the photosensitive drum 44. The following components also surround the photosensitive drum 44: a transfer charger 48 for transferring the toner image formed on the circumferential surface of the photosensitive drum 44 to the sheet P; a peeling craw 49 for peeling the copying sheet P off the circumferential surface of the photosensitive drum 44; cleaning device for cleaning the residual toner from the circumferential surface of the photosensitive drum 44; and a discharger 51 for discharging the circumferential surface of the photosensitive drum 44.

The machine body 10 is provided at its lower portion with an upper paper cassette 52, a middle paper cassette 53, and a lower paper cassette 54, each of which can be pulled out from the machine body 10, are arranged to be stacked on each other. These cassettes contain copy sheets different from each other in size. Near these cassettes, a large capacity paper feeder 55 having a capacity of containing three thousands of copy sheets of a size frequently used, e.g. A4 size is arranged. Above the large capacity paper feeder 55, a feeding cassette 57 also functioning as a manual feed tray 56 is detachably arranged.

In the machine body 10, a sheet conveying path 58 is formed to extend from each of the cassettes and large capacity paper feeder 55 to the end thereof with a fixing device 60 having a fixing lamp 60a through a transfer section positioned between the photosensitive drum 44 and the transfer charger 48. The machine body sidewall facing the fixing device 60 is provided with an output port 61 attached to a finisher 150 having a single tray.

Each of the upper paper cassette 52, the middle paper cassette 53, the lower paper cassette 54, the feeding cassettes 57, and the large capacity paper feeder 55 is provided at the neighborhood thereof with a pick-up roller 63 for picking a copy sheet P from the cassette or the feeder one by one. In order to convey the picked copy sheets through the conveying path 58, the conveying path 58 is provided with a plurality of feeding roller pairs 64.

The conveying path 58 is further provided therein with a resist roller pair 65 in the upper stream of the photosensitive drum 44. The resist roller pair 65 corrects the skew of the picked copy sheet P, aligns the distal end of the copy sheet P with the distal end of the toner image on the photosensitive drum 44, and feeds the copy sheet P to the transfer section at the same speed as the rotating speed of the photosensitive drum 44. In front of the resist roller pair 65, i.e., in front of the feeding roller pairs 64, an pre-aligning sensor 66 for sensing the arrival of the copy sheet P is arranged.

The copy sheet P picked up from one of the cassettes or the feeder 55 by the pick-up roller 63 is conveyed to the resist roller pair 65 by the feeding roller pairs 64. After aligning the distal end of the copy sheet P with the distal end of the developed image, the copy sheet P is conveyed to the transfer section.

In the transfer section, the developed image, i.e., the toner image formed on the photosensitive drum 44 is transferred onto the copy sheet P by the transfer charger 48. The toner image transferred onto the copy sheet P is peeled off the circumferential surface of the photosensitive drum 44 by the peeling charger 47 and the craw 49, and conveyed to the fixing device 60 through a conveyer belt 67 as a part of the conveying path 52. After the fixing device 60 fuses the developing agent of the image to fix the developed image onto the copy sheet P, the copy sheet P is discharged onto the finisher 150 through the output port 61 by a feeding roller pair 68 and an output roller pair 69.

Below the conveying path 58, an automatic overturning device 70 is arranged to overturn the copy sheet P passing through the fixing device 60 and to feed the overturned copy sheet P to the resist roller pair 65 again. The automatic overturning device 70 comprises a temporary accumulating section 71 for temporarily accumulating the copy sheet P; an overturning path 72 as a branch of the conveying path 58, for overturning the copy sheet P passing through the fixing device 60 to guide to the temporary accumulating section 71; a pick-up roller 73 for picking the copy sheets P accumulated in the temporary accumulating section 71 up one by one; and a feeding roller 75 for feeding the picked copy sheet P to the resist roller pair 65 via a conveying path 74. At the branching portion of the conveying path 58 and the overturning path 72, a switching gate 76 is arranged for selectively providing the copying sheet P to either of the output port 61 and the overturning path 72.

In performing the both-sides copying operation, the copy sheet P is guided to the overturning path 72 by the providing gate 76. The overturned copy sheet P is accumulated in the temporary accumulating section 71 for a while, then conveyed to the resist roller pair 65 through the conveying path 74 by the pick-up roller 73 and the feeding roller pair 75. After the skew-correction and the alignment by the resist roller pair 65, the copy sheet P is conveyed to the transfer section again such that toner image is transferred onto the rear face of the copy sheet P. Thereafter, the copy sheet P travels through the conveying path 58, the fixing device 60, and the output roller 69, and then is output to the finisher 150.

The finisher 150 is designed to collect the output copy sheets in a predetermined unit, hold them with a staple, and accumulate therein. Every time when one sheet to be held by a staple together with the other sheets output from the output port 61, a guide bar 151 pushes the output sheet to the position at which the sheets are held with a staple. When all the sheets to be held as a unit are output, a paper weight arm 152 fixes the unit of the output sheets, and a stapler unit. (not shown) holds the unit of sheets with a staple. Subsequently, the guide bar 151 descends in order to output the stapled unit of sheets to a finisher output tray 154 by a finisher output roller 155. The descending depth of the finisher output tray 154 is determined to some extent by the number of the output sheets. The finisher output tray 154 descends every time when one unit of document sheets is output. The guide bar 151 for aligning the output copy sheet P is positioned at a level not to contact the unit of sheets which has been stapled and output to the finisher output tray 154.

The finisher output tray 154 is connected to a shifting mechanism (not shown) for shifting the output place of the copy sheet one by one (in front, rear, left, and right directions, for example) for every outputting, in a sorting mode.

The machine body 10 is further provided in the front thereof at the upper portion with an operation panel 80 with use of which the user inputs instructions for various copying conditions and a copying operation starting signal for starting the copying operation.

Figure 2:
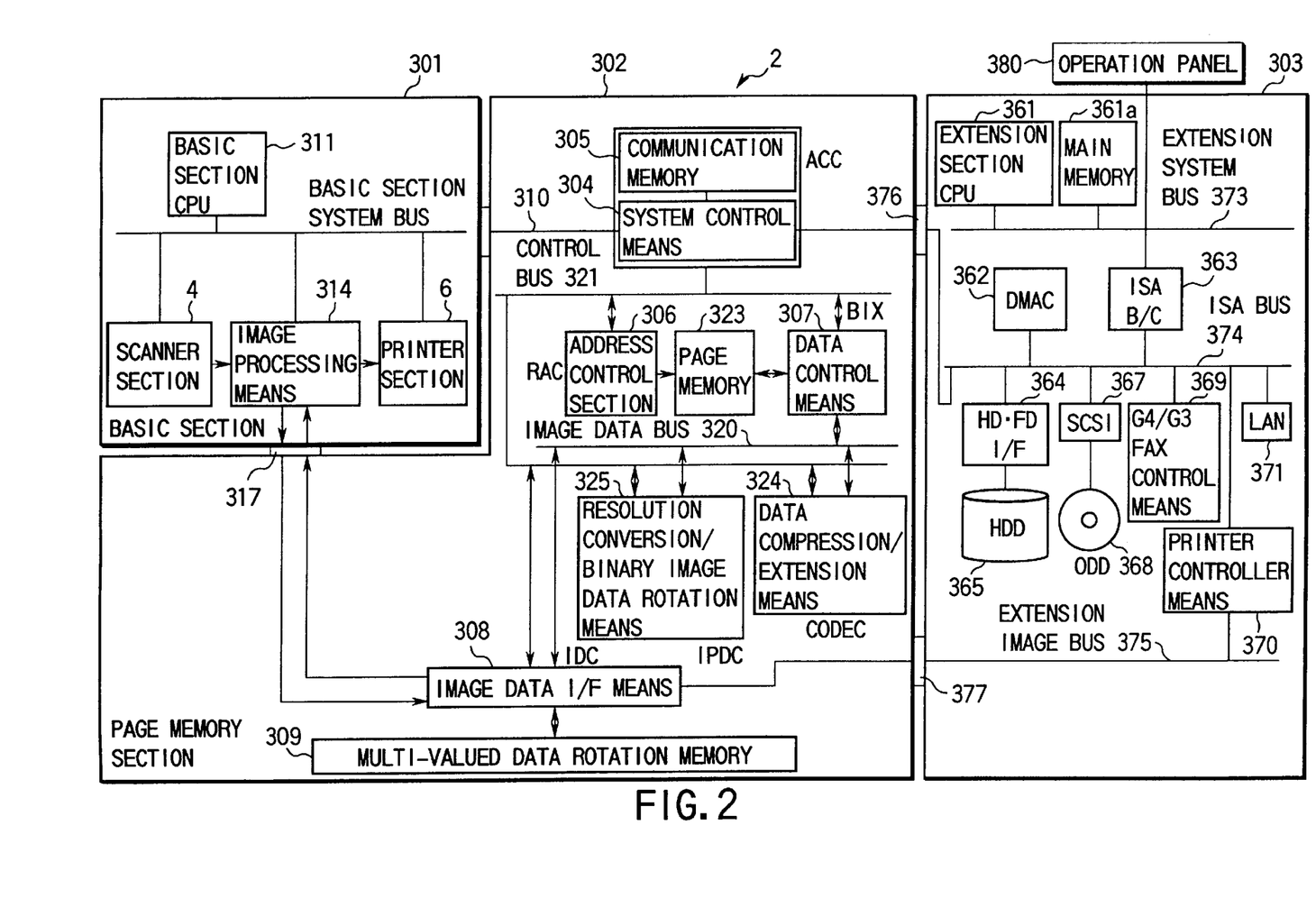
FIG. 2 is a block diagram showing a control system of the digital copying machine shown in FIG. 2.

Next, a control system of the digital copying machine having the above-mentioned structure will be described below with reference to FIG. 2.

The control system of the digital copying machine comprises three main sections: a basic section 301 as a main block of the digital copying machine, which has image processing means 314 connecting the scanner section 4 and the printer section 6; a page memory section 302 for realizing memory copy (electric sorting) operation by recording the image data received from the basic section 301 and transferring it to the basic section 301 again; and an extension section 303 including a hard disk (HD) as a secondary memory for storing compressed image data transferred from the page memory section 302, a FAX board (G4/G3 FAX control means) 369 for transferring/receiving the compressed image data to/from the outside through the public telephone line; a LAN board (local area network control means) 371 for transferring/receiving the compressed image data to/from the other section in the same locality through the LAN line; a mother board having an extension section CPU 361 for controlling the FAX board and the LAN board through a system bus 373 and an ISA bus 374, a main memory 361a used by the extension section CPU 361, and a DMAC 362 for controlling the DMA transfer through the ISA bus 374.

The basic section 301 and the page memory section 302 are connected by a basic section system interface 316 through which control data is transferred and a basic section image interface 317 through which image data is transferred. The page memory section 302 and the extension section 303 are connected by an extension section system interface 376 through which control data is transferred and an extension section image interface 377 through which image data is transferred.

The inner structure of the above three main sections will be described below with reference to FIG. 2.

The basic section 301 comprises input means (the scanner section) 4; output means (the printer section) 6; image processing means 314; and control means (the basic section CPU) 311 for controlling them.

The scanner section 4 has a quadruplex CCD 34 comprising a plurality (one line) of photoconductive elements arranged in a line, and reads the image of the document mounted on the document mount 12 in unit of a line in accordance with the instruction from the basic section CPU 311. The scanner section 4 converts the image density of the image into the digital data of 8 bits, and outputs the converted data as time series digital data together with a synchronizing signal to the image processing means 314 through a scanner interface (not shown).

The basic section CPU 311 controls each components of the basic section 301 and each components of the page memory section 302.

The page memory section 302 as the other one of the main sections of the control system comprises:

system control means 304 incorporating therein a communication memory 305, and for controlling the transfer of the control data between the basic section CPU 311 in the basic section 301 and the extension section CPU 361 in the extension section 303 and for controlling an access from the basic section 301 and the extension section 303 to the page memory 323; storing means (a page memory) for temporarily storing image data; an address controlling section for generating addresses of the page memory 323; an image data bus 320 through which image data is transferred among the devices in the page memory section 302; a control bus through which a control signal is transferred between the devices in the page memory section 302 and the system controlling means 304; data control means 307 for controlling data transfer between the page memory 323 and the other device through the image data bus 320; image data I/F means 308 for interfacing the basic section 301 and the basic image interface 317 when the image data is transferred therethrough; resolution conversion/binary image data rotation means for converting the resolution of the image data into the resolution of the other machine when the image data is transferred to the other machine having different resolution from that of the machine of the present invention, for converting the resolution of the image data received from the other machine having different resolution into the resolution of the printer section 6 of the basic section 301, and for executing 90° rotation processing of the binary image data; data compression/extension means 324 for compressing the input image data to transfer the image data by the apparat us such a s a FAX which transfers data after compressing the data o r to store the data in a device such as an optical disk, which stores data after compressing the data, and for extending the compressed image data to visualize the image data with use of the printer section 6; and a multi-valued data rotation memory 309 connected to the image data I/F means 308 and used to rotate the image data output from the printer section 6 by 90 ° or −90°.

The extension section 303 as the other one of the mains sections of the control system comprises: control means (the extension section CPU) for controlling the devices in the extension section 303 through the extension system bus 373, a main memory 361a used by the extension CPU 361; an ISA bus 374 for a general use; an ISA bus controller (ISA•B/C) 363 for interfacing an extension system bus 373 and the ISA bus 374; a DMA (DtAC) controller 362 for controlling the data transfer through the ISA bus 374; storing means (HDD) 365 connected to the ISA bus 374, for electrically storing image data; an HD•FD interface (HD•FD I/F) 364 as an interface between the storing means 365 and the ISA bus 374; storing means (the optical disk: ODD) 368 connected to the ISA bus 374, for electrically storing the image data; an SCSI interface 367 as an interface between the storing means 368 and the ISA bus 374; local area (LAN) network control means 371 for attaining the LAN function;

printer controller means 370 for attaining the printer function; G4/G3 FAX control means 369 having the G4/G3 FAX control function; and an extension image bus 375 for outputting the image data output from the printer controller means 370 to the page memory section 302 through the system image interface 377.

A hard disk HD contained in the HDD 365 stores as a file compressed image data of every document comprising one or a plurality of pages so as to be retrieved by corresponding retrieval data.

The extension system bus 373 is connected to the operation panel comprising a keyboard from which an instruction to the extension section 303 is input, and a display.

The storing means (ODD) 368 is connected to the ISA bus 374 through the SCSI interface 367, and the extension section CPU 361 controls the storing means 368 through the extension system bus 373, the ISA•B/C 363, and the ISA bus 374 with use of SCSI command.

Next, the image data I/F means (the image data control means) 308 will be described below. The image data I/F means 308 performs the image data transfer between the scanner section 4 or the printer section 6 and the page memory 323 through the image data processing means 314. The image data I/F means 308 performs the image data transfer between the printer controller 370 or the like connected to the extension image bus 375 and the page memory 323.

The page memory 323 in the page memory section 302 used in this embodiment has a large memory capacity.

Figure 3:
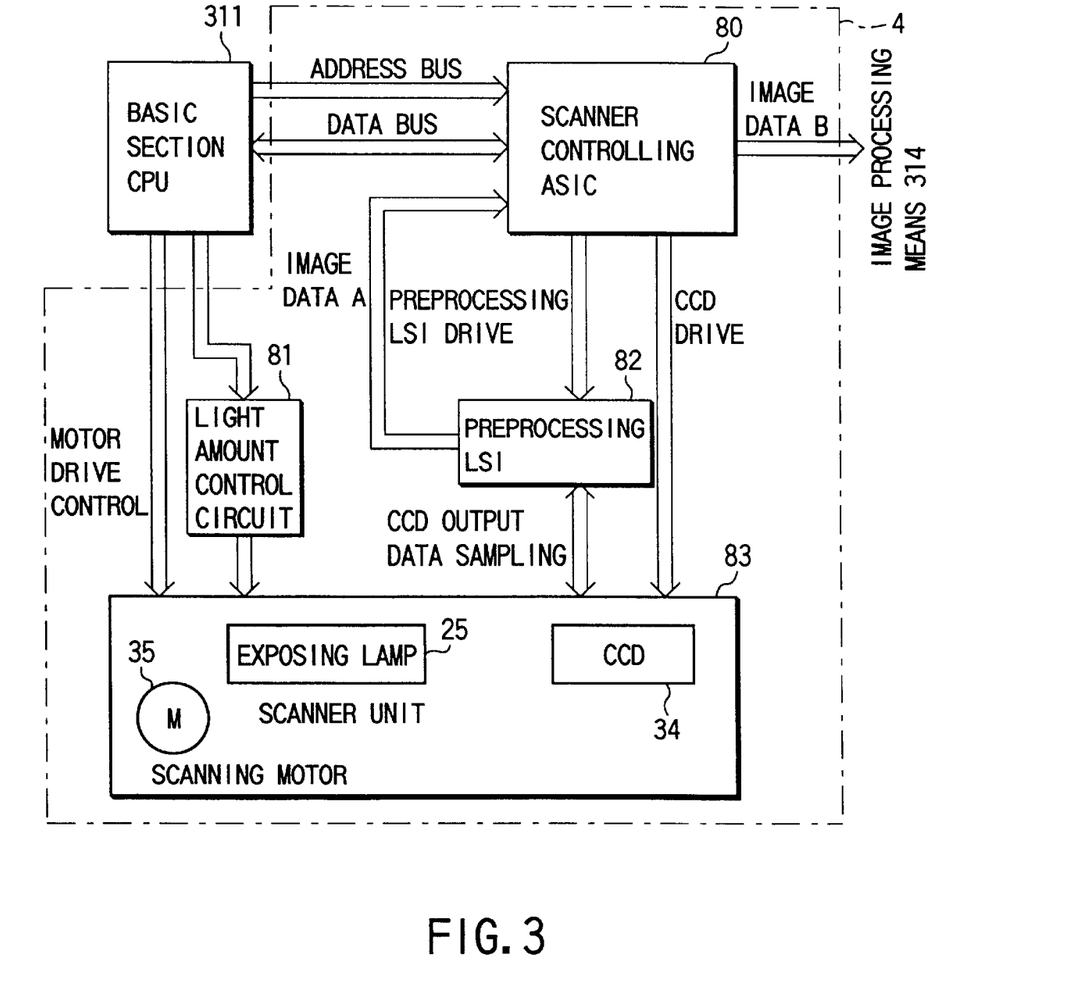
FIG. 3 is a block diagram schematically showing the control system in a scanner section of the digital copying machine.

FIG. 3 is a block diagram schematically showing the control system in the scanner section 4 of the digital copying machine. The scanner section 4 connected to the basic section CPU 311 comprises an ASIC 80 for controlling the scanner; a light amount control circuit 81; a preprocessing LSI 82; and a scanner unit 83 including the exposing lamp 25, the CCD 34, the scanning motor 35, and the like.

The basic section CPU 311 and the scanner controlling ASIC 80 are connected by the data bus and the address bus serving as an interface thereof.

The basic section CPU 311 drives and controls the scanning motor 35 of the scanner unit 83.

The ASIC 80 drives and controls the CCDs of the CCD 34 of the scanner unit 83 in order to process image data read in the main scanning direction.

The ASIC 80 then drives and controls the preprocessing LSI 82. In this time, the ASIC 80 samples the output signal of the CCD 34 by driving the preprocessing LSI 82 so as to amplify the analog CCD output signal to a signal level suitable for the processing. In this time, the CCD output signal is A/D converted to be turned into image data A as a digital signal, and stored in the ASIC 80. The ASIC 80 then executes the shading correction for the image data A therein, and sends the corrected image data to image processing means 314 in the latter processing block as image data B (the ASIC 80 also has the function of throughputting the image data A).

FIGS. 4A, 4B, 4C, 4D, 4E, and 4F are timing charts for explaining the operation of the CCD 34.

Each signal indicated in the drawings will be described at first.

Figure 4A:
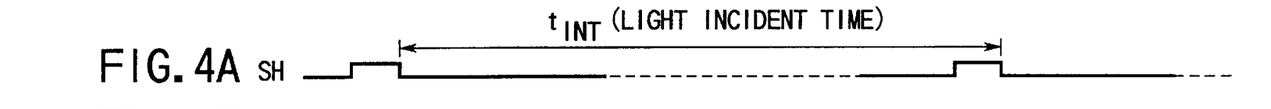
FIGS. 4A, 4B, 4C, 4D, 4E, and 4F are timing charts for explaining the operation of a CCD.

"SH" in FIG. 4A denotes a pulse signal supplied to a shift gate of the CCD 34, for transferring to the CCD analog shift register the electric charge signal stored in a photosensing section of the CCD 34.

Figure 4B:
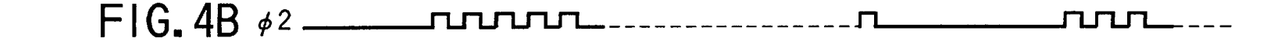
Figure 4C:
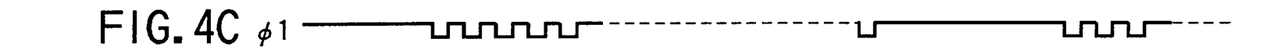

Transfer clock signals denoted as ø1 and ø2 shown in FIGS. 4B and 4C are two-phase pulse signals supplied to electrodes constituting the CCD analog shift register, for serially transferring the electric charge signals to the output section of the CCD 34.

Figure 4D:
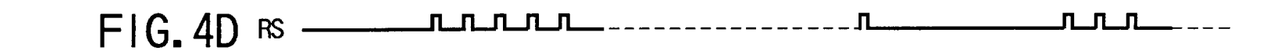

A reset pulse signal RS shown in FIG. 4D is a pulse signal for resetting the voltage of a floating junction of the output section of the CCD 34 in units of pixel.

Figure 4E:
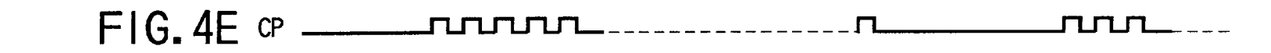

A clamp pulse signal CP shown in FIG. 4E is a pulse signal for clamping the reset voltage of the floating junction in the output section of the CCD 34 at a precharge level of an output direct voltage.

Figures 4F, 5A:
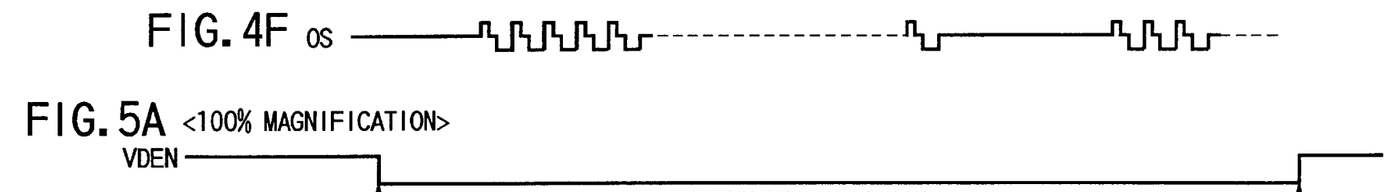
FIGS. 5A, 5B, 5C, and 5D are timing charts showing the relationship between an effective image signal effective image signal in the main scanning direction and that in the sub-scanning direction.
Figure 5B:
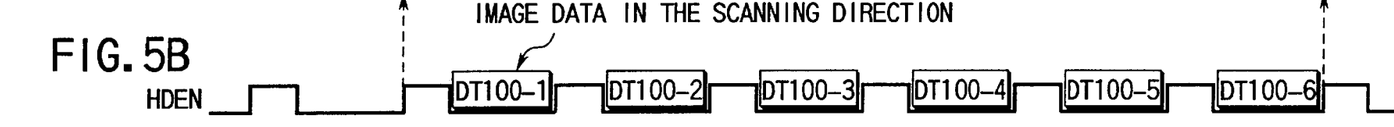
Figure 5C:
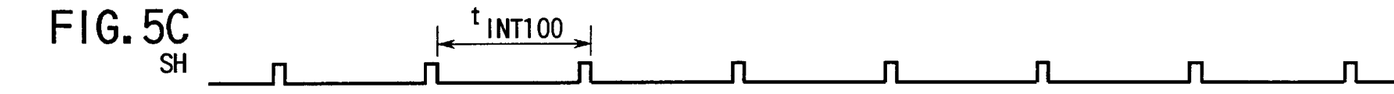
Figure 5D:
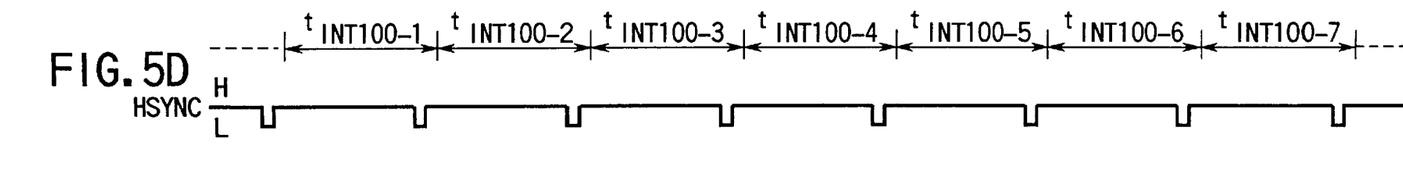
Figure 6A:
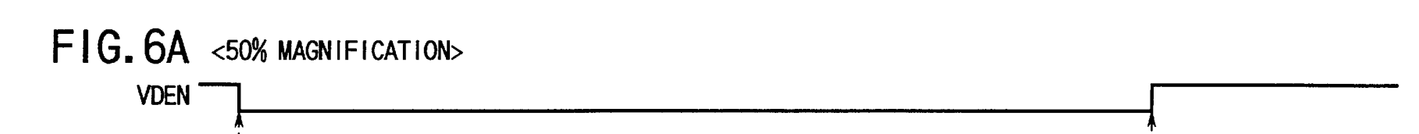
FIGS. 6A, 6B, 6C, and 6D are timing charts showing the relationship between an effective image signal effective image signal in the main scanning direction and that in the sub-scanning direction.
Figure 6B:
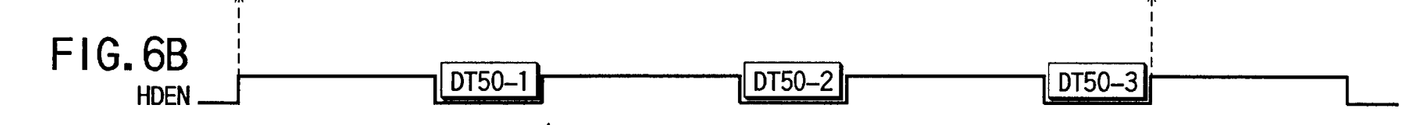
Figure 6C:
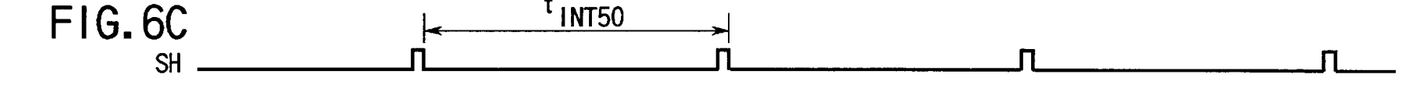
Figure 6D:
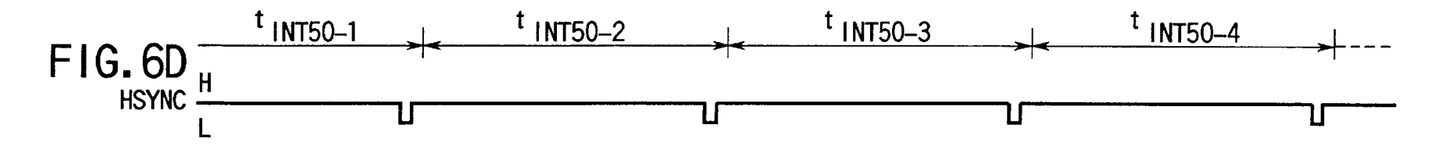

"OS" shown in FIG. 4F denotes the CCD output signal.

"$t_{INT}$" (light incident time) denotes the cyclic period of the shift gate signals SH. After the period has passed, the signals SH are output. During the period, light energy is converted into an electric charge signal in the photosensing section of the CCD 34, and stored.

FIGS. 5A, 5B, 5C, and 5D, and 6A, 6B, 6C, and 6D are timing charts showing the relationship between an image effective signal in the main scanning direction and that in the sub-scanning direction. FIGS. 5A, 5B, 5C, and 5D show the case where the magnification rate is 100% (i.e., the image is not magnified/reduced), and FIGS. 6A, 6B, 6C, and 6D show the case where the magnification rate is 50% (i.e., the image is reduced). The feature of the present invention will be described below by comparing the cases at the 100% magnification and at the 50% magnification.

The period $t_{INT}$ of the gate signal SH equals to a period of time required for moving a distance (42 μm, when the image resolution is 600 dpi) on the document at a preset scanning speed of the carriage in the scanner section 4. During this period of time, one line of data of 7500 effective pixels of CCD 34 and the margin thereof is processed by scanning the document in the sub-scanning direction. The one line of data is constituted of an effective pixel signal and a dummy signal: the effective pixel signal represents data of the 7500 effective pixels of the CCD 34; and the dummy signal represents data of the margin of the CCD 34.

The data processing in image reduction operation according to the conventional method will be presented below to compare it with the present invention. According to the conventional method, the light incident time $t_{INT}$ is set to be constant at a value set for the case where the image is not magnified/reduced. The scanning speed of the carriage of the section 4 at the 50% magnification is the double of magnification rate of that at the scanning speed at the 100% magnification. Thus, assuming that the scanning speed at the 100% magnification is "1", the scanning speed at the 50% magnification is "2". The distance for which the carriage moves during the light incident time $t_{INT}$ at the 50% magnification can be thus defined as the double of the distance at the 100% magnification (i.e., when the moving distance at the 100% magnification is "1", that at the 50% magnification is "2").

Accordingly, in the scanning operation in the main scanning direction during the light incident time $t_{INT}$, one line of image data obtained at the 50% magnification has double information amount of that of image data at the 100% magnification. During the light incident time $t_{INT}$, the image region on the document is controlled substantially by two signals: an effective image signal HDEN in the main scanning direction; and an effective image signal VDEN in the sub-scanning direction, which is determined by the count number of the effective image signal HDEN. The number of the image data (number of lines) defined by the effective image signal HDEN in the area defined by the effective image signal VDEN at the 50% magnification is a half of that of the 100% magnified image, while, the scanning speed of the carriage at the 50% magnification is the double of the 100% magnification, and thus the image data at the 50% magnification is compressed in the image region.

The data processing in image reduction operation according to the conventional method is performed by changing the scanning speed, as mentioned above. Unlike the conventional method, the present invention maintains the scanning speed of the carriage at a constant level. Instead of changing the scanning speed, the present invention sets the light incident time $t_{INT}$ to be variable in accordance with the magnification rate, thereby attains the similar function to that of the conventional one (i.e., to change the magnification rate in the sub-scanning direction).

In the present invention, the scanning speed of the carriage of the scanner section 4 is not different at the 100% and 50% magnifications. Instead of changing the scanning speeds, the present invention changes the light incident time $t_{INT}$. Assuming that a light incident time $t_{INT}$ 100 at the 100% magnification is "1", a light incident time $t_{INT}$ 50 at the 50% magnification is "2", i.e., the double of the light incident time $t_{INT}$ 100. The moving distance of the carriage of the scanner section 4 during the light incident time $t_{INT}$ 50 at the 50% magnification is thus the double of that during the light incident time $t_{INT}$ 100 at the 100% magnification.

Accordingly, the image data which is defined by the effective image signal HDEN of one line of the electric charge signal obtained in the main scanning direction by the scanner and accumulated during the light incident time $t_{INT}$ 50 at the 50% magnification has the double information amount of that of the image data which is defined by the effective image signal HDEN of one line of the electric charge signal obtained by the scan in the main scanning direction and accumulated during the light incident time $t_{INT}$ 100 at the 100% magnification. In other words, one line of the image data at the 50% magnification has the information amount of two lines of the image data at the 100% magnification.

The scanning speed of the carriage of the scanner section 4 is the same at the 50% and at 100% magnifications, and thus also the cyclic periods of the effective image signal VDEN at the magnifications are equal to each other in time length. The number of effective image data in the main scanning direction in units of line is defined by the enable effective image signal HDEN in a VDEN enable region (i.e., in an effective image data region in the sub-scanning direction) in which the effective image signal VDEN is in an enable state. In a region defined by two cycles of the effective image signal HDEN of the 100% magnification, one line of data of the 50% magnification is obtained. In scanning another line of the image data of the 50% magnification, the effective image signal HDEN at the 50% magnification is set in a disable state. Thus, the count number of the effective image signals HDEN in the VDEN enable region at the 50% magnification is a half of the count number of the effective image signal HDEN at the 100% magnification.

In the scanner controlling ASIC 80, a main scanning periodic signal HSYNC is cleared upon the rising of the clock signal when the signal HSYNC is set at a "L" level. The ASIC 80 generates the output timing of the shift gate signal SH by comparing the cleared signal HSYNC with the output of a counter the value of which is counted up upon the rising of the clock signal when the level of the main scanning periodic signal HSYNC is set at "H". The cyclic period of the shift gate signal SH thus depends on the cycle of the main scanning periodic signal HSYNC. The main scanning periodic signal HSYNC is a reference signal for executing the processing cyclically in units of one line in the main scanning direction.

The cyclic period of the main scanning periodic signal HSYNC at the 50% magnification is the double of that at the 100% magnification. Accordingly, the cycle of the shift gate signal SH at the 50% magnification is also the double of that at the 100% magnification in accordance with the cyclic period of the main scanning periodic signal HSYNC. In short, the light incident time $t_{INT}$ 50 is the double of the light incident time $t_{INT}$ 100.

At the 100% magnification shown in FIGS. 5A, 5B, 5C, and 5D, the image data obtained by the output of the CCD 34 during the light incident time $t_{INT}$ 100-1 is DT100-1. The image data corresponding to the light incident time $t_{INT}$ 100-2 is DT100-2. Similarly, the image data corresponding to the light incident time $t_{INT}$ 100-n is DT100-n.

At the 50% magnification shown in FIGS. 6A, 6B, 6C, and 6D, the image data generated from the output of the CCD 34 during the light incident time $t_{INT}$ 50-1 is DT50-1. The image data corresponding to the light incident time $t_{INT}$ 50-2 is DT50-2. Similarly, the image data corresponding to the light incident time $t_{INT}$ 50-n is DT50-n.

The image data of the lines to be scanned during the light incident time $t_{INT}$ 100-1 at the 100% magnification and the light incident time $t_{INT}$ 100-2 corresponds to the image data of the lines to be scanned during the light incident time $t_{INT}$ 50-1 at the 50% magnification.

The image data of the lines to be scanned during the light incident time $t_{INT}$ 100-3 at the 100% magnification and the light incident time $t_{INT}$ 100-4 corresponds the image data of the line to be scanned during the light incident time $t_{INT}$ 50-2 at the 50% magnification. Similarly, the image data represented by DT100-1 and DT100-2 at the 100% magnification corresponds to the image data represented by DT50-1 at the 50% magnification, and the image data represented by DT100-3 and DT100-4 at the 100% magnification corresponds to the image data represented by DT50-2 at the 50% magnification. The same may be said for the other image data.

The carriage scanning distance during the period of time defined by the effective image signal VDEN at the 100% magnification is equal to that during the period of time defined by the effective image signal VDEN at the 50% magnification.

As described above, the photosensing section of the CCD 34 converts light energy into an electric charge signal and accumulates it. By variably controlling the cycle of the light incident time $t_{INT}$, i.e., the cycle of the shift gate signal SH, the present invention changes the magnification rate of the image. The present invention thus provides the copying machine with a light amount control circuit 81 for controlling the light amount in accordance with the light incident time $t_{INT}$.

An exposing saturation light amount is set for the CCD 34 to limit the incident light amount entering into the CCD 34. The exposing saturation light amount is the exposing light amount at which the output signal is saturated. The exposing saturation light amount needs to be set such that incident light amount is lower than a normal exposing light amount. In addition, the output voltage of the CCD 34 is saturated when the incident light amount reaches at a level (the voltage at the time is referred to as a saturated output voltage VSAT: hereinafter, referred to as "voltage VSAT"). The exposing saturation light amount thus needs to be set such that half of the VSAT is the maximum value (MAX) in order to suitably control the incident light amount.

The signal output voltage of the CCD 34 also depends on the light incident time $t_{INT}$. The light amount control circuit 81 thus needs to be to optimize the incident light amount also in consideration of the light incident time $t_{INT}$ when the light incident time $t_{INT}$ is variably controlled. The incident light amount is basically set to be about half of the VSAT when the light incident time $t_{INT}$ is maximum.

The magnification rate control in the sub-scanning direction of the present invention has been described above by comparing the processings at the 50% and 100% magnifications. The present invention is not limited to these magnification rates, but can control the other all magnification rates (i.e., reduction, non-reduction/magnification, or magnification).

The present invention can be employed together with the conventional method. For example, the present invention is employed for the magnification control within a scope of magnification rate at which the high-speed scanning is required, and the magnification control within the other scope of the magnification rate which can be obtained by relatively low-speed scanning is performed according to the conventional method. In an electric copying machine capable of reduction/magnification of image within a range of 25–400%, the magnification control within a scope of 25–50% (i.e., in a fine reduction operation) is performed by the method of the present invention, and the magnification rate control within scopes of 50–100% and 100–400% (i.e., when general reduction and non-reduction/magnification are performed) may be performed in accordance with the conventional method. The scanning speed of the scanner is generally required to increase in the image reduction operation, and thus the present invention is properly applied to fine reduction operation.

According to the above-mentioned embodiment of the invention, the magnification rate of the scanner in the sub-scanning direction is controlled not by the variable control of the scanning speed of the carriage, but by variably controlling the light incident time (the cycle of the shift gate signal) of the CCD 34. In this manner, the present invention can suppress or prevent the functional problems which will occur as the scanning speed increases: a problem of the increase of the run-up distance of the scanner unit in the sub-scanning direction, which will occur in accelerating a stepping motor; and the image distortion due to the vibration of a carriage, which is generated by the high-speed scanning operation.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming method of forming image on an image forming medium by using setting means for setting a magnification rate for magnification rate change operation such as reduction, non-reduction/magnification, and magnification; scanning means for scanning a document by irradiating the document with a light beam; and photoelectric conversion means for receiving reflected light from the document scanned by the scanning means and for photoelectrically converting the reflected light into an electric charge signal to accumulate it, wherein the scanning speed of the scanning means is switched to be set at a constant level or variable in accordance with the magnification rate set by the setting means, when the scanning speed of the scanning means is set at the constant level by the switching means, the scanning speed of the scanning means is controlled at the constant level irrelevant to the magnification rate set by the setting means, and when the scanning speed of the scanning means is set variable, the scanning speed of the scanning means is controlled to be variable in accordance with the magnification rate set by the setting means, when the scanning speed of the scanning means is set at the constant level, a period of time during which the reflected light converted into the electric charge signal is accumulated in a photosensing section of the photoelectric conversion means is variably controlled in accordance with the magnification rate, and when the scanning speed of the scanning means is set variable, the period of time during which the reflected light converted into the electric charge signal is accumulated in a photosensing section of the photoelectric conversion means is set at a constant value, image processing is executed during one of the variably controlled period of time and the constant period of time on the basis of the electric charge signal accumulated in the photoelectric conversion means, and an image is formed on the image forming medium on the basis of the processed image data.

2. An image forming method according to claim 1, wherein the scanning speed of the scanner is set at the constant level to execute an image reduction operation when the magnification rate set by the setting means is ranged from the minimum to a value less than a predetermined rate, and to execute one of operations such as magnification and non-reduction/magnification when the magnification rate set is ranged from the predetermined rate to the maximum, the scanning speed of the scanner is set variable.

* * * * *